Dec. 17, 1946.  J. D. MORGAN ET AL  2,412,827
METHOD FOR DETECTING FREE HYDROGEN IN SUBMARINE ATMOSPHERES
Filed Jan. 1, 1944  2 Sheets-Sheet 1
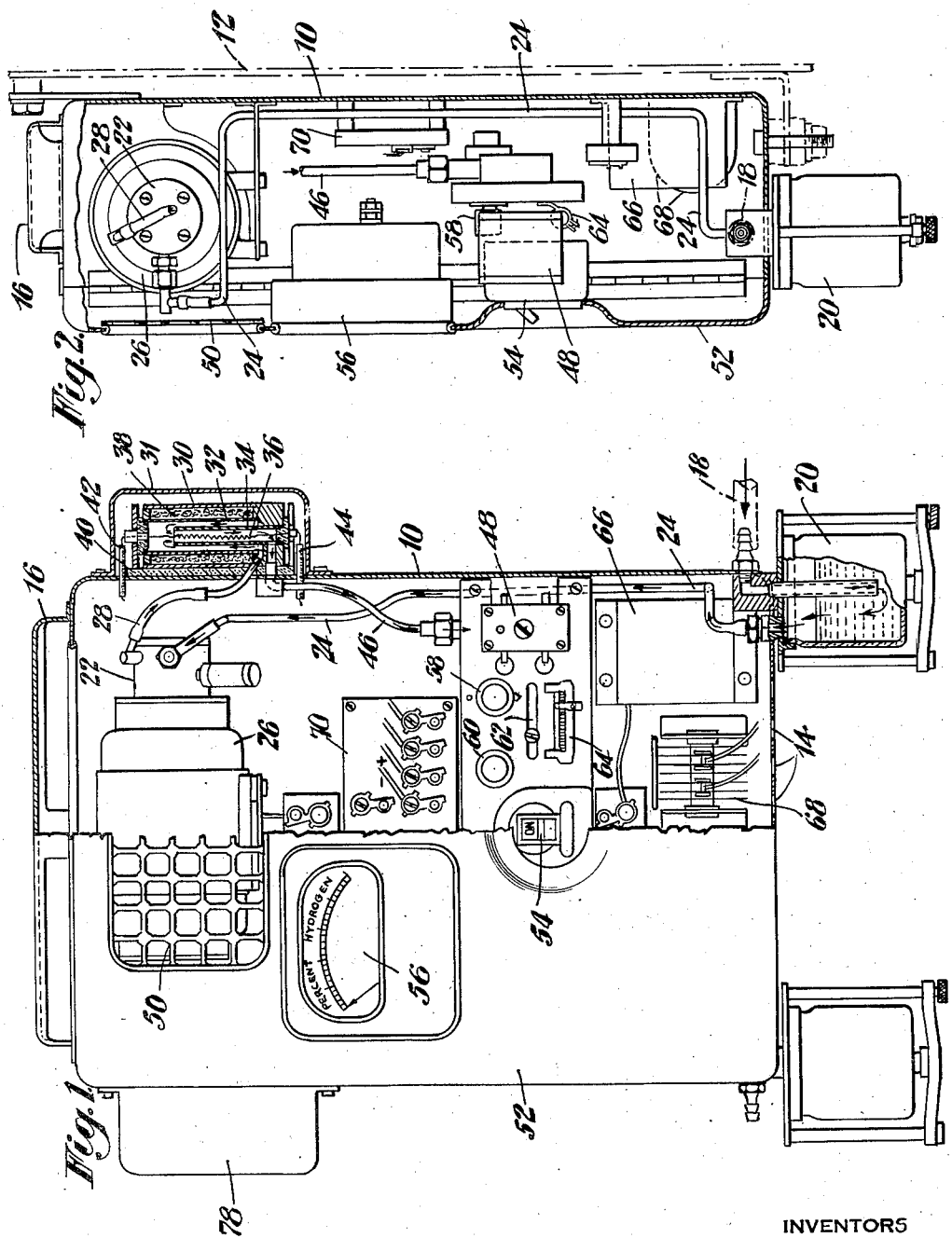
INVENTORS
JOHN D. MORGAN
ALAN P. SULLIVAN
BY Edmund G Borden ATTORNEY

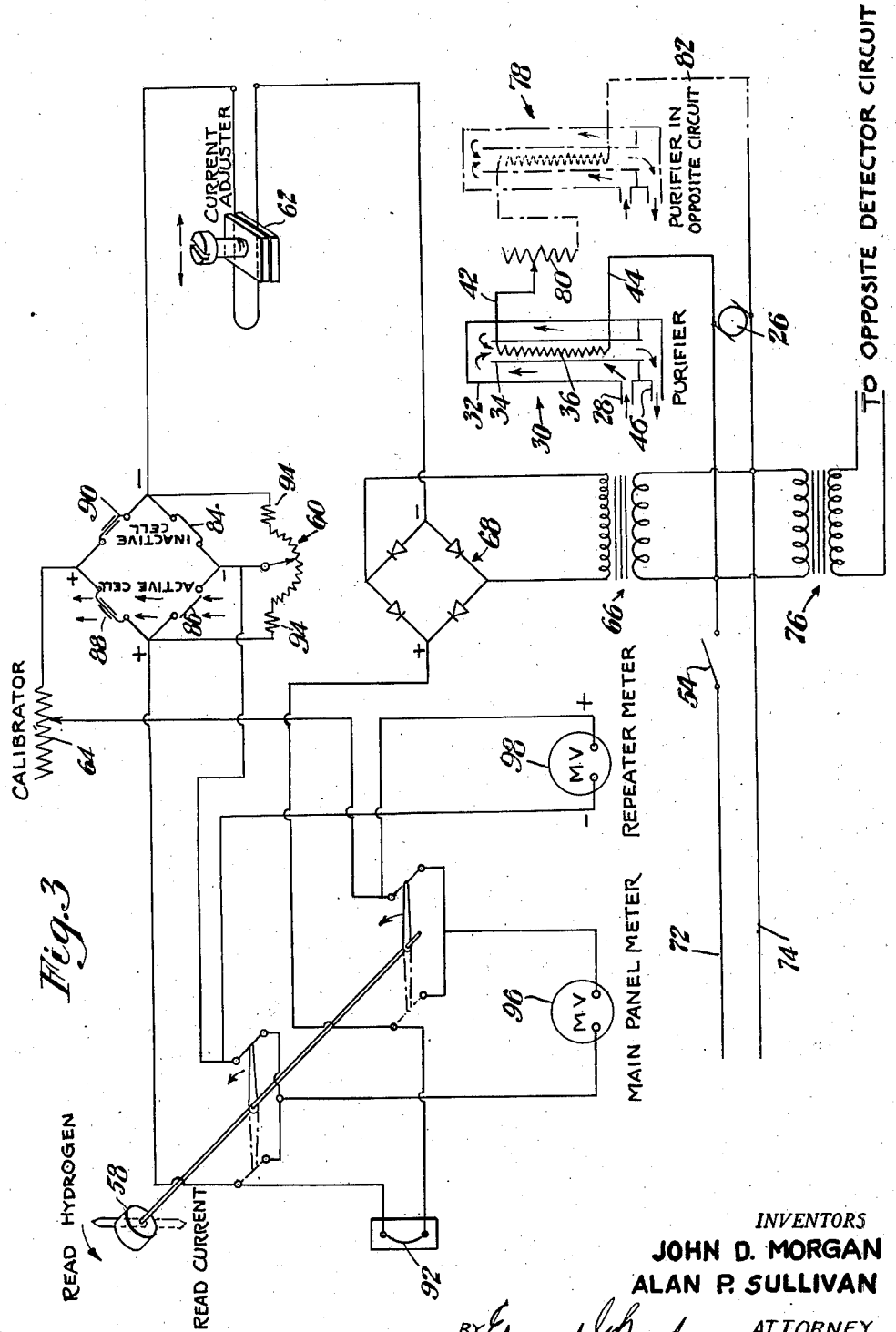

Patented Dec. 17, 1946

2,412,827

UNITED STATES PATENT OFFICE 2,412,827

METHOD FOR DETECTING FREE HYDROGEN IN SUBMARINE ATMOSPHERES

John D. Morgan, South Orange, and Alan P. Sullivan, Elizabeth, N. J., assignors to Cities Service Oil Company, New York, N. Y., a corporation of Pennsylvania Application January 1, 1944, Serial No. 516,745

5 Claims. (Cl. 23—232)

1

This invention relates to improvements in method for detecting free hydrogen in the atmospheres of submarine boats, particularly the free hydrogen developed by the submarine storage batteries.

A very serious problem in the operation of submarine boats is the production of hydrogen by electric storage batteries usually mounted in both forward and aft compartments of the submarine. These batteries are ventilated by ducts which discharge the battery atmosphere out to the air when the submarine is on the surface. But when the submarine operates below the surface there is a constant accumulation of free hydrogen in the atmosphere and the danger of producing an explosive mixture. The danger of explosion is not generally appreciated although relatively small percentages of free hydrogen of the order of 2% to 3% is sufficient to cause hydrogen ignition and explosion.

An attempt to analyze the submarine atmosphere or the atmosphere in the battery ducts with the ordinary combustion analyzers was unsuccessful because these analyzers, mostly of the Wheatstone bridge analyzer type, were found to be inaccurate and to have a very short life. In this connection, it was discovered that the storage batteries produced gases such as stibine and arsine which poison the catalyst wires of the Wheatstone bridge. It was also discovered that even without these catalyst poisons the usual combustion analyzers gave results which were entirely too low and therefore could not be relied upon.

The primary object of the present invention is therefore to provide an improved method for detecting free hydrogen in submarine atmospheres which avoids the difficulties and objections pointed out above.

A further object of the invention is to provide an improved Wheatstone bridge analyzer, particularly adapted for the detection of small percentages of free hydrogen in atmospheres and which has a long life, particularly suiting it for use on submarines.

Another object of the invention is to provide a method for detecting small percentages of free hydrogen developed by electric storage batteries and contained in the atmospheres of submarines along with catalyst poisons such as stibine and arsine.

According to the features of the present invention, an improved Wheatstone bridge type analyzer is employed for the detection of free hydrogen in submarine atmospheres and the operation

2 is carried out by drawing air from the duct leading from each of the submarine batteries, washing the stream of air, passing it through a catalyst poison eliminator for destroying stibine, arsine and similar catalyst poisons, and then conducting the stream of air to an analyzer cell which determines, in connection with a calibrated electric indicator device, the percentage of free hydrogen in the stream. The detector of the present invention is mounted conveniently in the submarine and operated continuously so that the crew can see at a glance the condition of the atmosphere in the battery ducts and therefore take the necessary measures to ventilate the submarine if the hydrogen content rises above any predetermined maximum.

The improved process and apparatus of the present invention includes other features as will be apparent from the description given hereinafter.

Additional objects and advantages of the present invention will be apparent to those skilled in the art from the following more detailed description thereof taken in connection with the accompanying drawings in which:

Fig. 1 is a front elevational view of a duplex hydrogen detector constructed in accordance with the present invention with one side cut away and some parts shown in section.

Fig. 2 is a side elevational view of the apparatus shown in Fig. 1 with portions of the case cut away to show certain elements of the apparatus.

Fig. 3 is a wiring diagram or detector wiring circuit for one of the hydrogen detectors shown in Figs. 1 and 2.

The apparatus shown in Figs. 1 and 2 is a duplex detector which separately handles a continuous sample of the atmosphere taken from the ventilation ducts of the forward and aft storage battery compartments of a submarine. The apparatus includes a case 10 which is mounted at a convenient location in the submarine, as for example on a panel 12 (Fig. 2). The bottom of the case is provided with air vents 14 while the top is provided with a shielded air outlet 16. The two detector circuits in the case 10 have certain parts of the apparatus in common with certain interconnections, but in general they are mounted respectively on or in the two sides of the case, and the specific description will therefore be limited to one circuit and the parts of the apparatus which are common to the two detectors.

A continuous sample of gas is taken from the ventilation duct of the aft storage battery compartment and conducted through a tube 18 into a glass washing bottle 20 which is nearly filled with distilled water to free the air-gas sample of any dust and extraneous materials which might be taken up by the water. The air sample is bubbled through the water and in fact drawn into the tube 18 by means of a suction pump 22 which is connected to the top of the mounting for the bottle 20 by means of a suction tube 24. The pump 22 is attached directly to one end of, and operated by an electric motor 26, the opposite end of which also carries another pump similar to pump 22, to draw gas from the forward compartment ventilation duct. The pump 22 delivers the air-gas sample through a tube 28 into a catalyst poison eliminator or gas purifier 30 which is mounted in a case 31 on the upper out-side of the case 10.

The gas from the tube 28 passes into the lower portion of a tube 32, then upwardly in an annular passage around an inner tube 34, and finally downwardly through the tube 34 where the gas is heated by a Nichrome electric resistance heating spiral 36 which is adapted to heat the gas to a temperature of from 750° to 950° F. It has been discovered that stibine and arsine are decomposed by heating them to a temperature of at least 750° F. and that the heating of the gas mixture in the above temperature range does not affect the free hydrogen contained in the gases.

The tube 32 is insulated on the outside by a layer of insulation 38 and the purifier is insulated from the case 10 by means of an asbestos layer 40. Electric current is supplied to the spiral heater 36 by leads 42 and 44. The gas sample passing through the annular space between the tubes 32 and 34 flows counter-current to the gas in the tube 34 and is preheated by heat conducted through the tube 34. Purified gas reaching the lower end of the tube 34 is conducted through tubing 46 to a catalytic combustion detector cell 48 in which the free hydrogen content of the gas is burned in contact with a catalytic leg of a Wheatstone bridge detector for the determination of the free hydrogen content. The gas discharged from the cell 48 passes into the case 10, mixes with the air therein, and is vented through the ventilator 16 or through a cane metal ventilator 50 set in the upper part of a door 52 which covers the entire front of the case 10.

Other elements of the apparatus which are shown in Figs. 1 and 2 and which will be described more in detail in connection with Fig. 3 of the drawings, include a main current switch 54, a meter 56 for the forward storage battery compartment for indicating the percentage of hydrogen, a meter switch 58 for the aft detector meter, a potentiometer 60, a current adjuster 62, a calibrator 64, a transformer 66, a rectifier 68 and a connector panel 70.

The wiring diagram for the apparatus shown in Fig. 3 is a simplified form which primarily relates to only one of the hydrogen detector circuits.

Electric current for the entire apparatus is supplied through leads 72 and 74 from a generator on the submarine delivering 120 volt, 60 cycle A. C. current. The main switch 54 is included in one of these leads from which current is taken directly to the motor 26 and to the transformer 66 as indicated. Connections are also shown to a transformer 76 for the "opposite detector circuit" mounted in the left hand side of the case 10 (Fig. 1). The leads 72 and 74 also supply A. C. current to the purifier 30 in series with the current for a purifier 78 for the forward detector. The series electric circuit for the purifiers include the lead 44, the resistance heating element 36, the lead 42, a 25 ohm, 10 watt resistor 80, a resistance heating element in the purifier 78 (like 36), and the return lead wire 82. Approximately 55 volts is supplied to each of the purifiers 30 and 78, and the resistance 80 is used to adjust this current to give the proper temperature so that a known sample of gas containing, for example, 5% of hydrogen can be passed through the purifiers without changing the percentage of hydrogen. The resistance heating element 36 has been observed to be approximately a dull red color in the dark when the purifier was operating at a temperature which would not affect the free hydrogen content of the gas, but which would decompose impurities such as stibine and arsine. The temperature range given above is approximately right, but there is a range of from 200° to 300° F. within which the purifiers may be operated with satisfactory performance of the detectors.

The Wheatstone bridge detector arrangement which is mounted in the detector cell 48, shown generally in Fig. 1, comprises catalytic legs 84 and 86 and non-catalytic legs 88 and 90 (Fig. 3). The wires used in the legs 88 and 90 may be the same as those used for the legs 84 and 86, for example platinum, but they are covered with a fine glass tubing to make them non-catalytic. In the past, the non-catalytic legs of Wheatstone bridges for analizing gases containing combustibles have been rendered so by coating them with nickel which in use is converted to nickel oxide, but it has not been found possible to use nickel with the hydrogen detector because of a loss in sensitivity of the readings and because of the shift in the zero reading of the meter. However, the covering of the legs 88 and 90 with small glass tubing has been found to give excellent results. Current from the transformer 66 is supplied to the rectifier 68 from which rectified D. C. current for operating the Wheatstone bridge detector is supplied through the lead wires indicated, one lead wire of which includes the current adjuster 62 which comprises a hairpin loop of Nichrome wire connected by a slidable silver clamp by which the length of wire through which the current travels may be changed. The other lead wire from the rectifier 68 is connected through the mechanism of the meter switch 58 and includes a shunt 92. The bridge legs 84, 86, 88, and 90 are preferably of the same resistance, the legs 86 and 88 being mounted directly in the gas stream (indicated by arrows) passing through the detector cell 48, while the legs 84 and 90 are kept out of contact with the stream in a sealed or vented compartment where they are maintained under stable conditions. The potentiometer 60 is connected across the current leads for the Wheatstone bridge and has a value of 200 ohms. Each of the leads for the potentiometer includes a 25 ohm resistance 94. The potentiometer 60 is used to electrically balance the Wheatstone bridge to a zero reading on a main panel meter 96 for the aft battery compartment and on a repeater meter 98. The meter 96 is like the forward panel meter 56 (Fig. 1).

The main panel meter 96 is connected into the Wheatstone bridge through the mechanism of the switch 58 and reads directly the percentage of hydrogen in the atmosphere being tested when the switch 58 is in the full line position indicated. The calibrator resistance 64 is mounted in one of the leads from the meter 96 to the Wheatstone bridge. The repeater meter 98 reading percent hydrogen is connected in parallel with the meter 96, the leads thereto being connected between the Wheatstone bridge and the switch 58 as indicated. Meter 98 may be located at a station in the submarine which is distant from the detector apparatus.

The main meter 96 which is mounted in the door 52, like the meter 56, may be used to read current directly, that is, the current supplied to the Wheatstone bridge, by turning the switch 58 to the dotted line position indicated. This use of the meter 96 for determining the current flowing through the Wheatstone bridge does not affect repeater meter 98 which continues to read "percent hydrogen" in the atmosphere being drawn into the detector.

It has been found impossible to detect free hydrogen present in small percentages in atmospheres with an instrument which is designed to analyze combustion gases such as that disclosed in the applicants' Patent No. 2,273,981, because the instrument loses sensitivity in atmospheres containing small percentages of free hydrogen. However, it was discovered that free hydrogen in such atmospheres could be detected with an accuracy much better than 0.2% by using a Wheatstone bridge detector having legs of about 1 ohm resistance each, while employing a current of about 1.8 amps. on the bridge, which would produce a temperature just below visible red heat for the legs of the bridge. This temperature is distinctly lower than that required for Wheatstone bridge analyzers used in analysis of combustion gases in which a temperature of medium red heat or above is known to be used. In the above-mentioned patent, temperatures of 1400° F. or above are specified. A current of 1.8 amps. is also distinctly lower than the current of 2.3 amps. known to have been employed in a particular Wheatstone bridge analyzer for combustion or other gases of the type referred to.

According to the present invention the detector apparatus is preferably operated continuously in the submarine so that a continuous stream of the atmosphere from each battery ventilation duct is taken to the respective detectors. The hydrogen detection is accomplished by means of a single combustion detector cell. The pump 22 is adapted to draw from 60 to 65 cubic inches of gas per minute, the quantity being drawn at a substantially uniform rate and passed through the apparatus in the manner described above.

The percent hydrogen is therefore continuously indicated on the forward and after meters mounted in the cover of the detector 10 and on the repeater meters mounted at a selected distant station in the submarine. The apparatus is adapted to run continuously for a long period of time such as, for example, 5000 hours, after which the detector cell 48 may be replaced and other parts of the apparatus checked. The water in the wash bottles of course may be replaced at suitable intervals. During the operation, the current through the Wheatstone bridge detectors should be kept substantially constant and therefore the meter switch 58 (and the corresponding one for the forward battery compartment) may be turned to give the current reading on the main meter 96 (and 56). If an adjustment of the current is found necessary, this is quickly and readily taken care of by means of the current adjuster 62 (and the corresponding forward adjuster).

Before the apparatus is installed on a submarine, it should be calibrated, which is readily accomplished by supplying gas samples of known composition and marking the percentages on the meter scale opposite the indicators. The zero position on each scale is found in the manner described above and may be frequently checked by supplying only pure air to the apparatus. The operation and accuracy of the apparatus may be checked by supplying air containing a known percent of hydrogen, for example 3% to each detector circuit of the apparatus.

The panel 70 shown in Figs. 1 and 2 is merely a mounting for connector lugs for the lead lines to the repeater meter, lead lines for lights to the repeater meter and for A. C. current to the motor 26 and purifier 30 and 78.

Having thus described the invention in its preferred form, what is claimed as new is:

1. A method of detecting free hydrogen in submarine atmospheres which contain catalyst poisons such as stibine and arsine as well as free hydrogen, all produced by electric storage batteries used on the submarine, which comprises passing a continuously flowing stream of atmosphere from the battery compartment of a submarine through a heating zone, heating the gases in said zone under non-catalytic conditions to a temperature high enough to decompose any stibine and arsine contained in the stream but below a temperature at which free hydrogen would be caused to react with the oxygen in the atmosphere, passing the stream of atmosphere from said heating zone in a continuous stream into and through a combustion zone in contact with a hot catalytic wire leg of a Wheatstone bridge, and establishing an electric current in such bridge such as to heat said wire leg electrically to a temperature just below first visible red heat whereby free hydrogen in said stream in said combustion zone is burned and the temperature of said wire leg is raised.

2. A method of detecting free hydrogen as defined by claim 1 in which the stream of atmosphere in said heating zone is heated no higher than 950° F.

3. A method of detecting free hydrogen in submarine atmospheres which contain catalyst poisons such as stibine and arsine as well as free hydrogen, all produced by electric storage batteries used on the submarine, which comprises passing a continuously flowing stream of atmosphere from the battery compartment of a submarine through a heating zone, electrically heating the gases in said heating zone in the absence of combustion promoting catalysts to a temperature high enough to decompose any stibine and arsine contained in the stream but below a temperature at which free hydrogen would be caused to react with the oxygen in the atmosphere, passing the stream of atmosphere from said heating zone in a continuous stream into and through a combustion zone in contact with a hot catalytic wire leg of a Wheatstone bridge detector, and establishing a current in such bridge sufficient to heat said wire leg electrically to a temperature just below first visible red heat whereby free hydrogen in said stream in said combustion zone is burned and the temperature of said wire leg is raised, said wire leg being of such character as to be heated to the desired initial temperature by passage through such bridge of an electric current of approximately 1.8 amps.

4. A method of detecting free hydrogen in submarine atmospheres which contain catalyst poisons such as stibine and arsine as well as free hydrogen, all produced by electric storage batteries used on the submarine, which comprises passing a continuously flowing stream of atmosphere from the battery compartment of a submarine through a heating zone, heating the gases in said heating zone in the absence of combustion promoting catalysts to a temperature high enough to decompose any stibine and arsine contained in the stream but below a temperature at which free hydrogen would be caused to react with the oxygen in the atmosphere, passing the stream of atmosphere from said heating zone in a continuous stream into and through a combustion zone in contact with a hot combustion-promoting catalytic wire leg of a Wheatstone bridge detector, maintaining a current flow through such bridge sufficient to heat said wire leg electrically to a temperature just below first visible red heat whereby free hydrogen in said stream in said combustion zone is burned and the temperature of said wire leg is raised, and measuring the potential drop across such bridge resulting from the heating of said catalytic leg by burning hydrogen.

5. A method of detecting and determining the proportion of free hydrogen in submarine atmospheres which contain catalyst poisons such as stibine and arsine as well as free hydrogen, all produced by electric storage batteries used on the submarine, which comprises passing a continuously flowing stream of atmosphere from the battery compartment of a submarine through a heating zone, electrically heating the gases in said heating zone in the absence of combustion promoting catalysts to a temperature of from 750°–900° F. whereby to decompose any stibine and arsine contained in the stream without causing a reaction of the hydrogen and oxygen components thereof, passing the stream of atmosphere from said heating zone in a continuous stream into and through a combustion zone in contact with a hot catalytic wire leg of a Wheatstone bridge detector, heating said wire leg electrically by a current which is sufficient only to bring it to a temperature just below first visible red heat whereby free hydrogen in said stream in said combustion zone is catalytically burned and the temperature of said wire leg is further raised, and utilizing the rise in temperature of said leg resulting from the burning of hydrogen in contact therewith as a measure of the proportion of free hydrogen in said stream.

JOHN D. MORGAN.
ALAN P. SULLIVAN.